US011739694B2

(12) United States Patent
Bonnoitt et al.

(10) Patent No.: US 11,739,694 B2
(45) Date of Patent: Aug. 29, 2023

(54) EMBEDDED ELECTRIC MOTOR ASSEMBLY

(71) Applicant: General Electric Company, Schenectady, NY (US)

(72) Inventors: Michael Todd Bonnoitt, Cincinnati, OH (US); William Joseph Solomon, Montgomery, OH (US)

(73) Assignee: General Electric Company, Schenectady, NY (US)

( * ) Notice: Subject to any disclaimer, the term of this patent is extended or adjusted under 35 U.S.C. 154(b) by 77 days.

(21) Appl. No.: 16/848,923

(22) Filed: Apr. 15, 2020

(65) Prior Publication Data

US 2021/0324802 A1 Oct. 21, 2021

(51) Int. Cl.
*F02C 7/32* (2006.01)
*F01D 15/10* (2006.01)

(52) U.S. Cl.
CPC ................ *F02C 7/32* (2013.01); *F01D 15/10* (2013.01)

(58) Field of Classification Search
CPC .......... H02K 1/27; H02K 1/272; H02K 1/223; F01D 15/10; F02C 7/32; F05D 2220/76
See application file for complete search history.

(56) References Cited

U.S. PATENT DOCUMENTS 8,887,485 B2 11/2014 Ress, Jr.
9,077,221 B2 7/2015 McCormick
9,091,216 B2 7/2015 Macfarlane
9,482,235 B2 11/2016 Small
9,512,849 B2 12/2016 Naβ et al.
9,624,870 B2 4/2017 Ress, Jr. et al.
9,982,676 B2 5/2018 Eifert et al.
2007/0130959 A1* 6/2007 Linet ...................... F02C 3/113 60/802
2010/0127496 A1* 5/2010 Burkholder ............ F01D 15/10 290/46
2015/0104335 A1* 4/2015 Faller .................. F04D 29/5826 417/244
2016/0138603 A1 5/2016 Eifert et al.
2016/0160867 A1 6/2016 Gehlot
2016/0230768 A1 8/2016 Bambrogan et al.
2019/0136768 A1* 5/2019 Harvey .................. F02C 3/113
2019/0368500 A1* 12/2019 Epstein .................. F04D 25/04

FOREIGN PATENT DOCUMENTS

GB 546638 7/1942

* cited by examiner

*Primary Examiner* — Ehud Gartenberg
*Assistant Examiner* — Jacek Lisowski
(74) *Attorney, Agent, or Firm* — Hanley, Flight & Zimmerman, LLC

(57) ABSTRACT

A gas turbine engine includes a compressor section arranged in serial flow order with a turbine section, and an electric motor assembly. The electric motor assembly has a rotor assembly that is coupled to, or integrated within, a stage of compressor rotor blades of the compressor section and a stator assembly. The stator assembly is operable with the rotor assembly to rotate the rotor assembly relative to the stator assembly and drive the stage of compressor rotor blades about the axial direction.

15 Claims, 8 Drawing Sheets

EMBEDDED ELECTRIC MOTOR ASSEMBLY

FIELD OF THE DISCLOSURE

The present subject matter relates generally to a gas turbine engine having an embedded electric motor assembly.

BACKGROUND OF THE DISCLOSURE

Typical aircraft propulsion systems include one or more gas turbine engines. For certain propulsion systems, the gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

BRIEF DESCRIPTION OF THE DISCLOSURE

Aspects and advantages of the invention will be set forth in part in the following description, or may be obvious from the description, or may be learned through practice of the invention.

In one exemplary embodiment of the present disclosure, a gas turbine engine is provided. The gas turbine engine defines a radial direction and an axial direction. The gas turbine engine includes a turbine section and a compressor section that is arranged in serial flow order with the turbine section. The gas turbine engine also includes an electric motor assembly that has a stator assembly and a rotor assembly that is coupled to, or integrated within, a stage of compressor rotor blades of the compressor section of the gas turbine engine. The stator assembly is configured for electrical communication with an electricity source and operable with the rotor assembly to rotate the rotor assembly relative to the stator assembly and drive the stage of compressor rotor blades about the axial direction.

In another exemplary embodiment of the present disclosure, a method for driving a stage of compressor rotor blades for a compressor section of a gas turbine engine about an axial direction is provided. The gas turbine engine includes a turbine section arranged in serial flow order with the compressor section. The method includes coupling or integrating a rotor assembly of an electric motor assembly with the stage of compressor rotor blades. The method also includes providing an electric current to a stator assembly of the electric motor assembly configured for electrical communication with an electricity source. The stator assembly is operable with the rotor assembly to rotate the rotor assembly relative to the stator assembly. The method also includes driving the stage of compressor rotor blades about the axial direction.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE DISCLOSURE

Figure 1:
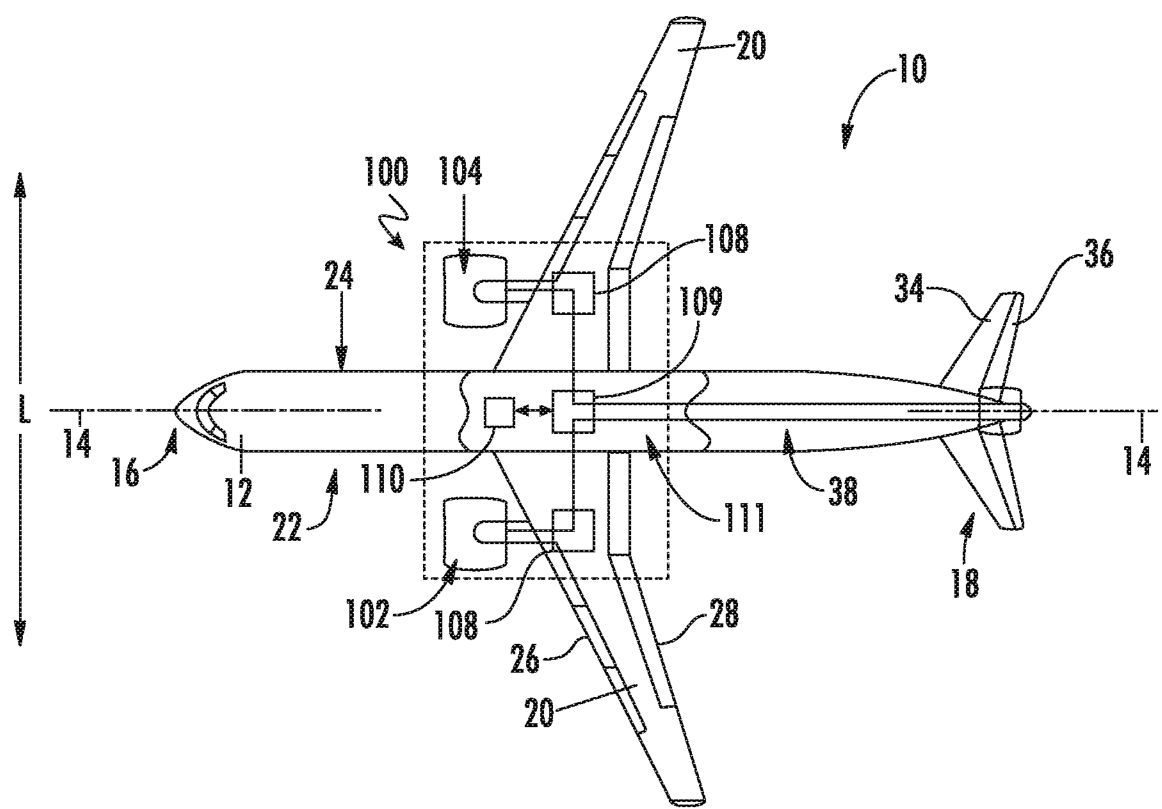
FIG. 1 is a top view of an aircraft according to various exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms “first”, “second”, and “third” may be used interchangeably to distinguish one component from another and are not intended to signify location or importance of the individual components. The terms “forward” and “aft” refer to relative positions within a gas turbine engine, with forward referring to a position closer to an engine inlet and aft referring to a position closer to an engine nozzle or exhaust. The terms “upstream” and “downstream” refer to the relative direction with respect to fluid flow in a fluid pathway. For example, “upstream” refers to the direction from which the fluid flows, and "downstream" refers to the direction to which the fluid flows. Terms of approximation, such as "substantially" or "about" or "approximately" refer to being within a 10% margin of error.

The present application is directed generally towards a gas turbine engine of a propulsion system for an aircraft having an electric motor embedded therein. In at least certain embodiments, the gas turbine engine includes a compressor section and a turbine section arranged in serial flow order and together defining a core air flowpath. A rotary component, such as a shaft or spool, is rotatable with at least a portion of the compressor section and the turbine section. The gas turbine engine can additionally include an electric machine embedded within the gas turbine engine. For example, the electric machine, when included, can be rotatable with the rotary component and can be positioned coaxially with the rotary component. In at least certain embodiments, the electric machine may be an electric generator, driven by the rotary component.

Figure 2:
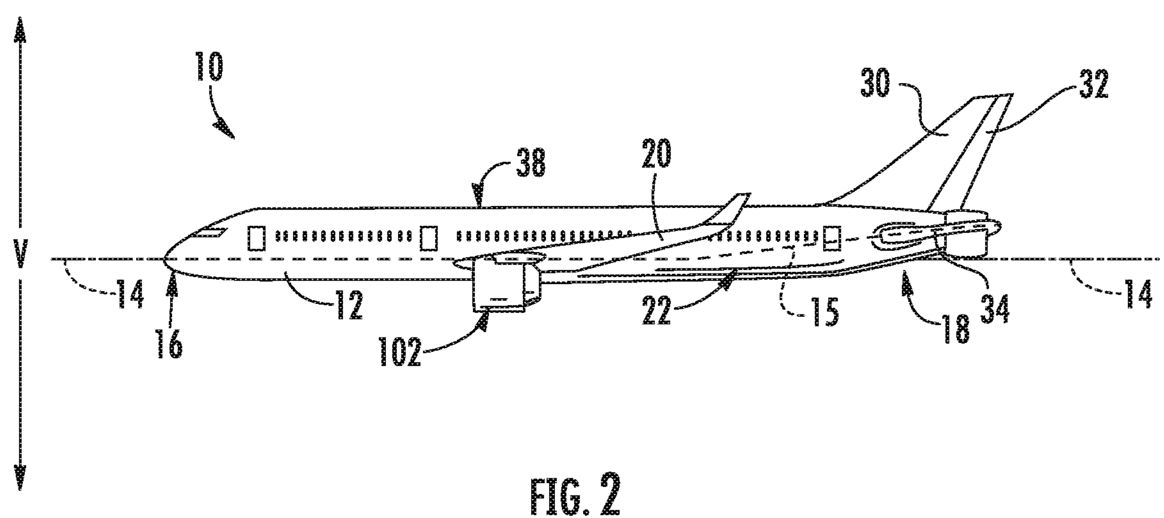
FIG. 2 is a port side view of the exemplary aircraft of FIG. 1

Referring now to the drawings, wherein identical numerals indicate the same elements throughout the figures, FIG. 1 provides a top view of an exemplary aircraft 10 that may incorporate various embodiments of the present disclosure. FIG. 2 provides a port side view of the aircraft 10 as illustrated in FIG. 1. As shown in FIGS. 1 and 2 collectively, the aircraft 10 defines a longitudinal centerline 14 that extends therethrough, a vertical direction V, a lateral direction L, a forward end 16, and an aft end 18. Moreover, the aircraft 10 defines a mean line 15 extending between the forward end 16 and aft end 18 of the aircraft 10. As used herein, the "mean line" refers to a midpoint line extending along a length of the aircraft 10, not taking into account the appendages of the aircraft 10 (such as the wings 20 and stabilizers discussed below).

Moreover, the aircraft 10 includes a fuselage 12, extending longitudinally from the forward end 16 of the aircraft 10 towards the aft end 18 of the aircraft 10, and a pair of wings 20. As used herein, the term "fuselage" generally includes all of the body of the aircraft 10, such as an empennage of the aircraft 10. The first of such wings 20 extends laterally outwardly with respect to the longitudinal centerline 14 from a port side 22 of the fuselage 12 and the second of such wings 20 extends laterally outwardly with respect to the longitudinal centerline 14 from a starboard side 24 of the fuselage 12. Each of the wings 20 for the exemplary embodiment depicted includes one or more leading edge flaps 26 and one or more trailing edge flaps 28. The aircraft 10 further includes a vertical stabilizer 30 having a rudder flap 32 for yaw control, and a pair of horizontal stabilizers 34, each having an elevator flap 36 for pitch control. The fuselage 12 additionally includes an outer surface or skin 38. It should be appreciated however, that in other exemplary embodiments of the present disclosure, the aircraft 10 may additionally or alternatively include any other suitable configuration of stabilizer that may or may not extend directly along the vertical direction V or horizontal/lateral direction L.

The exemplary aircraft 10 of FIGS. 1 and 2 includes a propulsion system 100, herein referred to as "system 100". The exemplary system 100 includes one or more aircraft engines. For example, the embodiment depicted includes a plurality of aircraft engines, each configured to be mounted to the aircraft 10, such as to one of the pair of wings 20. More specifically, for the embodiment depicted, the aircraft engines are configured as gas turbine engines, or rather as turbofan jet engines 102, 104 attached to and suspended beneath the wings 20 in an under-wing configuration.

For certain aircraft, it may be beneficial to provide variable vanes in a compressor section of a turbine engine in order for the engine to operate efficiently throughout the speed range of the engine. However, a variable vane system for a compressor section adds complexity to the compressor section and can increase costs and can sometimes introduce maintenance concerns. The technical effect of certain embodiments of the present invention include the capability to provide a compressor that can operate efficiently throughout the speed range of the engine without the expense and maintenance concerns of a variable vane system.

More specifically, according to certain embodiments, the speeds of individual or ganged sets of rotors can be independently controlled to achieve the optimum aerodynamic loading distribution for each stage in the compressor. The speed schedule can be controlled to maintain this optimum loading throughout the speed range without the need of a variable vane system.

In some examples, this is accomplished with an electric motor assembly. The electric motor assembly can include a rotor assembly that is coupled to, or integrated within, a ganged set or stage of compressor rotor blades. The electric motor assembly can also include a stator assembly that is configured for electrical communication with an electricity source and operable with the rotor assembly to rotate the rotor assembly relative to the stator assembly and drive the stage of compressor rotor blades about the axial direction. The use of an electric motor assembly, instead of a variable vane system, can reduce complexity, decrease costs, and can reduce maintenance concerns.

Referring still to the embodiment of FIGS. 1 and 2, in certain embodiments the propulsion system further includes one or more electric generators 108 operable with the jet engines 102, 104. For example, one or both of the jet engines 102, 104 may be configured to provide mechanical power from a rotating shaft (such as an LP shaft or HP shaft) to the electric generators 108. Although depicted schematically outside the respective jet engines 102, 104, in certain embodiments, the electric generators 108 may be positioned within a respective jet engine 102, 104. Additionally, the electric generators 108 may be configured to convert the mechanical power to electrical power. For the embodiment depicted, the propulsion system 100 includes an electric generator 108 for each jet engine 102, 104, and also includes a power conditioner 109 and an energy storage device 110. The electric generators 108 may send electrical power to the power conditioner 109, which may transform the electrical energy to a proper form and either store the energy in the energy storage device 110 or send the electrical energy to an electric motor assembly 300. For the embodiment depicted, the electric generators 108, power conditioner 109, and energy storage device 110 are all are connected to an electric communication bus 111, such that the electric generator 108 may be in electrical communication with the energy storage device 110, and such that the electric generator 108 may provide electrical power to one or both of the energy storage device 110. Accordingly, in such an embodiment, the propulsion system 100 may be referred to as a gas-electric propulsion system.

It should be appreciated, however, that the aircraft 10 and propulsion system 100 depicted in FIGS. 1 and 2 is provided by way of example only and that in other exemplary embodiments of the present disclosure, any other suitable aircraft 10 may be provided having a propulsion system 100 configured in any other suitable manner. For example, it should be appreciated that in various other embodiments, the propulsion system 100 may not include, e.g., the power conditioner 109 and/or the energy storage device 110, and instead the generator(s) 108 may be directly connected to the electric motor assembly 300.

Figure 3:
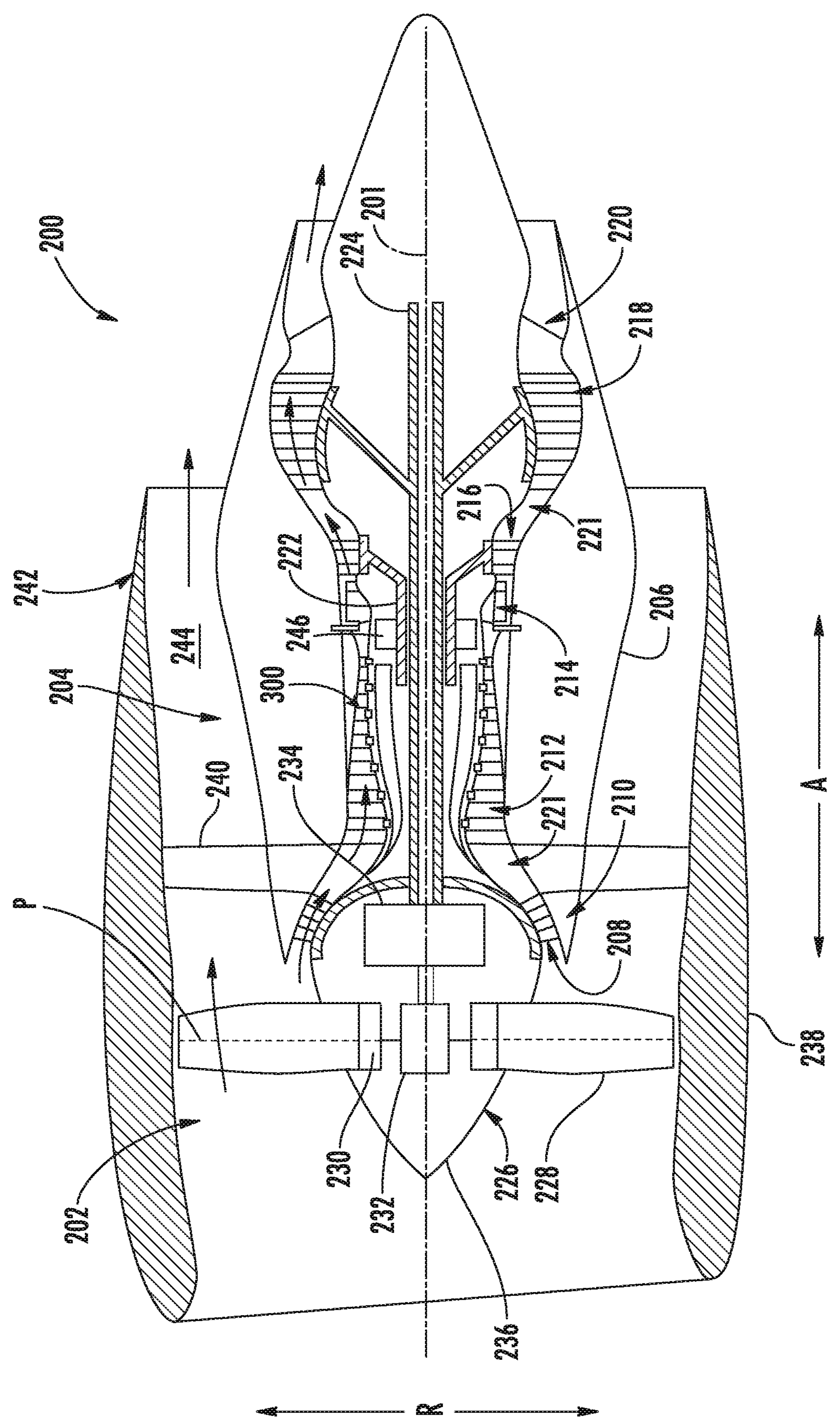
FIG. 3 is a schematic, cross-sectional view of a gas turbine engine in accordance with an exemplary aspect of the present disclosure.

Referring now to FIG. 3, a schematic cross-sectional view of a propulsion engine in accordance with an exemplary embodiment of the present disclosure is provided. In certain exemplary embodiments, the propulsion engine may be configured a high-bypass turbofan jet engine 200, herein referred to as "turbofan 200." Notably, in at least certain embodiments, the jet engines 102, 104 may be also configured as high-bypass turbofan jet engines. In various embodiments, the turbofan 200 may be representative of jet engines 102, 104. Alternatively, however, in other embodiments, the turbofan 200 may be incorporated into any other suitable aircraft 10 or propulsion system 100.

As shown in FIG. 3, the turbofan 200 defines an axial direction A (extending parallel to a longitudinal axis 201 provided for reference), a radial direction R, and a circumferential direction C (extending about the axial direction A; not depicted in FIG. 3). In general, the turbofan 200 includes a fan section 202 and a core turbine engine 204 disposed downstream from the fan section 202.

The exemplary core turbine engine 204 depicted generally includes a substantially tubular outer casing 206 that defines an annular inlet 208. The outer casing 206 encases, in serial flow relationship, a compressor section including a booster or low pressure (LP) compressor 210 and a high pressure (HP) compressor 212; a combustion section 214; a turbine section including a high pressure (HP) turbine 216 and a low pressure (LP) turbine 218; and a jet exhaust nozzle section 220. The compressor section, combustion section 214, and turbine section together define a core air flowpath 221 extending from the annular inlet 208 through the LP compressor 210, HP compressor 212, combustion section 214, HP turbine section 216, LP turbine section 218 and jet nozzle exhaust section 220. A high pressure (HP) shaft or spool 222 drivingly connects the HP turbine 216 to the HP compressor 212. A low pressure (LP) shaft or spool 224 drivingly connects the LP turbine 218 to the LP compressor 210.

For the embodiment depicted, the fan section 202 includes a variable pitch fan 226 having a plurality of fan blades 228 coupled to a disk 230 in a spaced apart manner. As depicted, the fan blades 228 extend outwardly from disk 230 generally along the radial direction R. Each fan blade 228 is rotatable relative to the disk 230 about a pitch axis P by virtue of the fan blades 228 being operatively coupled to a suitable actuation member 232 configured to collectively vary the pitch of the fan blades 228 in unison. The fan blades 228, disk 230, and actuation member 232 are together rotatable about the longitudinal axis 201 by LP shaft 224 across a power gear box 234. The power gear box 234 includes a plurality of gears for stepping down the rotational speed of the LP shaft 224 to a more efficient rotational fan speed.

Referring still to the exemplary embodiment of FIG. 3, the disk 230 is covered by rotatable front hub 236 aerodynamically contoured to promote an airflow through the plurality of fan blades 228. Additionally, the exemplary fan section 202 includes an annular fan casing or outer nacelle 238 that circumferentially surrounds the fan 226 and/or at least a portion of the core turbine engine 204. The nacelle 238 is supported relative to the core turbine engine 204 by a plurality of circumferentially-spaced outlet guide vanes 240. A downstream section 242 of the nacelle 238 extends over an outer portion of the core turbine engine 204 so as to define a bypass airflow passage 244 therebetween.

Although not depicted, the variety of rotatory components of the turbofan engine 10 (e.g., LP shaft 224, HP shaft 222, fan 202) may be supported by one or more oil lubricated bearings. The turbofan engine 10 depicted includes a lubrication system for providing one or more of the oil lubricated bearings with lubrication oil. Further, the lubrication system may include one or more heat exchangers for transferring heat from the lubrication oil with, e.g., bypass air, bleed air, or fuel.

Additionally, the exemplary turbofan 200 depicted includes an electric machine 246 rotatable with the turbine section. Specifically, for the embodiment depicted, the electric machine 246 is configured as an electric generator co-axially mounted to and rotatable with the HP shaft 222. As used herein, "co-axially" refers to the axes being aligned. It should be appreciated, however, that in other embodiments, an axis of the electric machine 246 may be offset radially from the axis of the HP shaft 222 and further may be oblique to the axis of the HP shaft 222, such that the electric machine 246 may be positioned at any suitable location.

In another example, the electric machine 246 is configured as an electric generator co-axially mounted to and rotatable with the LP shaft 224. It should be appreciated, however, that in other embodiments, an axis of the electric machine 246 may be offset radially from the axis of the LP shaft 224 and further may be oblique to the axis of the LP shaft 224, such that the electric machine 246 may be positioned at any suitable location at least partially inward of the core air flowpath 221.

Additionally, the exemplary turbofan 200 depicted includes one or more electric motor assembly 300. Specifically, for the embodiment depicted, the electric motor assembly 300 is integrated within the high pressure compressor 212 of the core turbine engine 204 and can be in electrical communication with the electric machine 246.

In certain exemplary embodiments, the one or more electric motor assembly 300 is configured in substantially the same manner as the exemplary electric motor assembly 300 described below. Notably, when the turbofan engine 200 is integrated into the propulsion system 100 described above with reference to FIGS. 1 and 2, the electric motor assembly 300 may be configured in substantially the same manner as the electric motor assembly 300 of FIG. 4.

It should be also appreciated, however, that the exemplary turbofan engine 200 depicted in FIG. 3 is provided by way of example only, and that in other exemplary embodiments, the turbofan engine 200 may have any other suitable configuration. For example, in other exemplary embodiments, the turbofan engine 200 may be configured as a turboprop engine, a turbojet engine, a differently configured turbofan engine, or any other suitable gas turbine engine.

Figure 4:
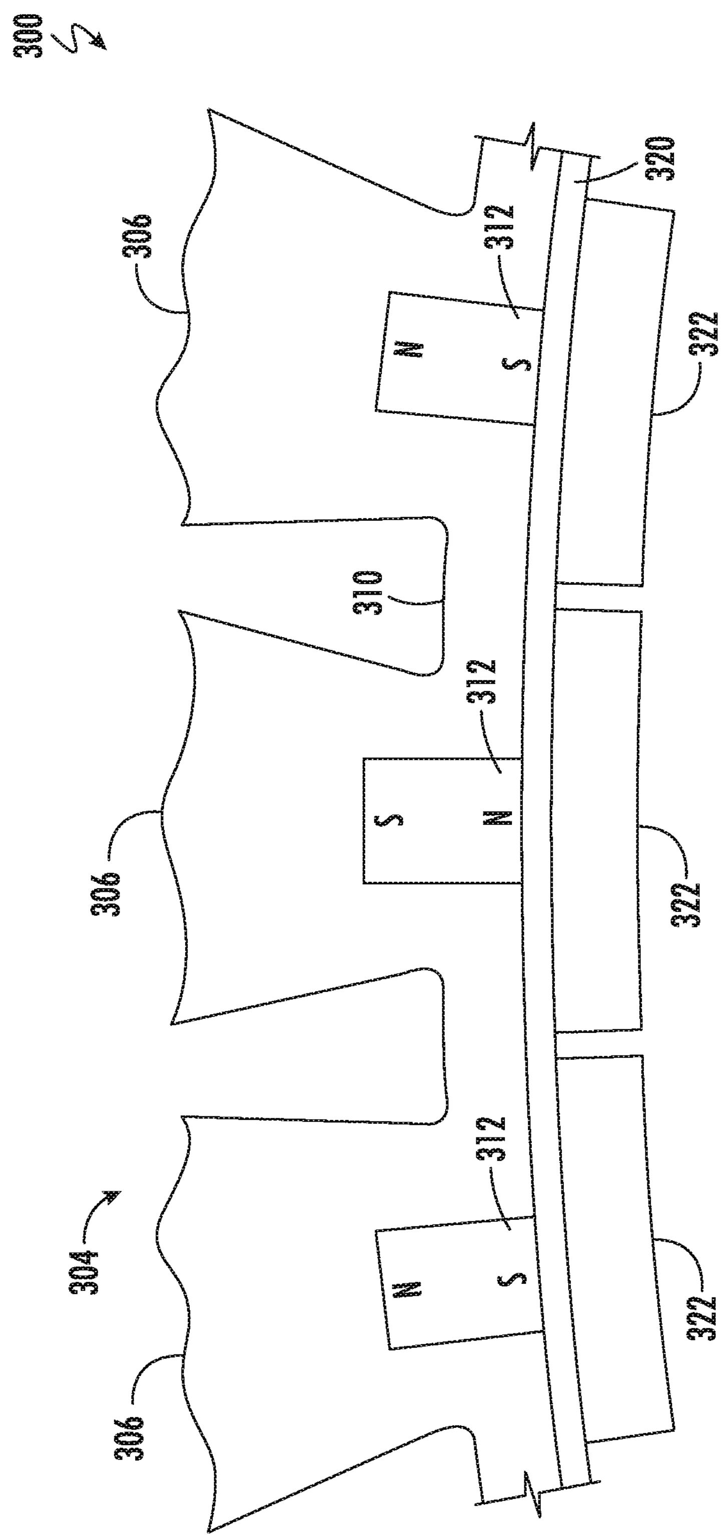
FIG. 4 is a schematic, cross-sectional view of an electric motor assembly in accordance with an exemplary embodiment of the present disclosure.

Referring now to FIG. 4, an electric motor assembly 300 in accordance with an exemplary embodiment of the present disclosure is depicted. As is depicted, the electric motor assembly 300 generally includes a rotor assembly 310 that is disposed circumferentially around a stator assembly 320. The stator assembly 320 can be mechanically coupled to a stationary portion of turbofan engine 200 such that it does not rotate. The rotor assembly 310 can be in mechanical communication with the stator assembly 320 such that it is configured to rotate around the stator assembly 320. For example, a rolling-element bearing (not depicted) can be disposed between the stator assembly 320 and the rotor assembly 310 so that the rotor assembly 310 can rotate around the stator assembly 320.

The stator assembly 320 can include a plurality of coils 322 near, within, or on the surface of the stator assembly 320. Each coil 322 can be an electromagnet that consists of wires wrapped around a core of a ferromagnetic material, such as iron. As such, each coil 322 can be configured such that when current is provided to it, a magnetic field is produced.

The rotor assembly 310 can be coupled to, or integrated within, a stage of compressor rotor blades 304 and can include a plurality of magnets 312, such as a plurality of permanent magnets. Each magnet 312 can include a north pole ("N") and a south pole ("S"). The orientation of each of the plurality of magnets 312 can alternate such that every other magnet has the same directional orientation and consecutive magnets have the opposite directional orientation.

In the example shown in FIG. 4, each rotor blade 306 within the stage of compressor rotor blades 304 is associated with a magnet 312 of the rotor assembly 310, and each magnet 312 is associated with a coil 322 of the stator assembly 320. However, it should be understood that a one-to-one ratio between the number of rotor blades 306 to magnets 312 is not required, and a one-to-one ratio between magnets 312 to coils 322 is not required. As just one example, each rotor blade 306 of the stage of compressor rotor blades 304 can be associated with two magnets 312 of the rotor assembly 310. In another example, each rotor blade 306 of the stage of compressor rotor blades 304 can be associated with three or more magnets 312 of the rotor assembly 310.

As will be explained in more detail, the stator assembly 320 can be configured for electrical communication with an electricity source 303, such as an energy storage device 302 or an electric machine 246, and operable with the rotor assembly 310 to rotate the rotor assembly 310 relative to the stator assembly 320 and drive the stage of compressor rotor blades 304 about the axial direction. In one example, the energy storage device 302 can be a battery and the electric machine 246 can be a generator.

More specifically, the coils 322 of the stator assembly 320 can be configured for electrical communication with the electricity source 303 and operable with the magnets 312 of the rotor assembly 310 to rotate the rotor assembly 310 relative to the stator assembly 320 and drive the stage of compressor rotor blades 304 about the axial direction. For example, providing an electrical current from the electricity source 303, such as an energy storage device 302 or an electric machine 246, into the coils 322 of the stator assembly 320 creates a magnetic field that interacts with the magnets 312 of the rotor assembly 310 to rotate the rotor assembly 310 relative to the stator assembly 320. A person of skill would recognize that electric motor assembly 300 can operate similarly as to how a brushless electric motor operates.

Figure 5:
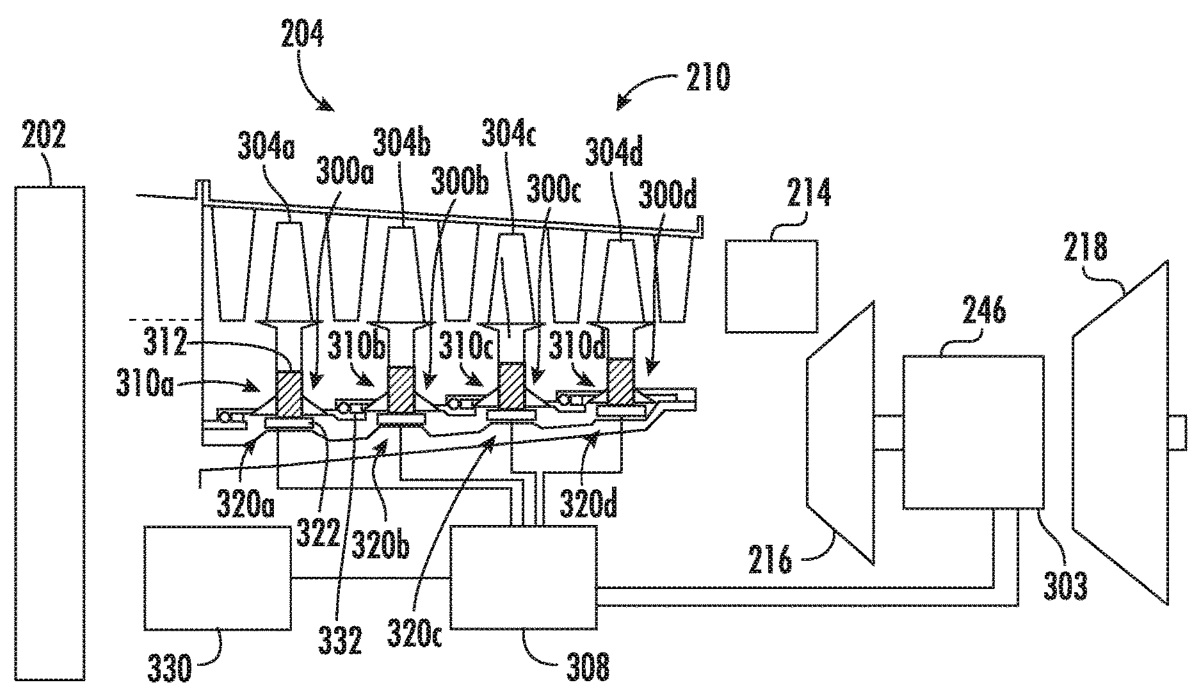
FIG. 5 is a schematic, cross-sectional view of an electric motor assembly embedded in a gas turbine engine in accordance with another exemplary embodiment of the present disclosure.

Referring now to FIG. 5, an electric motor assembly 300 embedded within a core turbine engine in accordance with an exemplary embodiment of the present disclosure is depicted. More particularly, for the embodiment depicted, the electric motor assembly 300 is embedded within a compressor section of the gas turbine engine, and more particularly still, is embedded within a HP compressor section of the gas turbine engine. Additionally, the electric motor assembly 300 is positioned at least partially within, forward, or aft of the compressor section along an axial direction.

For the embodiment depicted, the core turbine engine includes an electricity source 303 that is an electric machine 246, which is a generator embedded within a turbine section of the gas turbine engine, and more particularly still, is attached to an HP shaft 222 of the gas turbine engine. Additionally, the electric machine 246 is positioned at least partially within, forward, or aft of the turbine section along an axial direction.

In certain exemplary embodiments, the electric machine 246, the electric motor assembly 300, and the gas turbine engine depicted in FIG. 5 may be configured in substantially the same manner as the exemplary electric machine 246, electric motor assembly 300, and turbofan engine 200 described above with reference to FIG. 3. Accordingly, the same or similar numbers may refer to the same or similar parts.

As is depicted, the gas turbine engine includes a plurality of stages of compressor rotor blades 304, each stage of compressor rotor blades 304 being associated with a separate electric motor assembly 300. Each of the electric motor assemblies 300 is in electrical communication with a controller 308, a FADEC 330, and an electricity source 303, such as an electric machine or an energy storage device. The FADEC 330 system is configured to send instructions to the controller 308 regarding the desired rotational speed of each of the stages of compressor blades. The controller 308 is configured to send electrical current to the coils 322 of each of the electrical motor assemblies in response to the received desired rotational speeds of each of the stages of compressor blades. The controller 308 is in electrical communication with the electricity source 303. In this example, the turbine engine comprises four stages of compressor rotor blades 304 and four electric motor assemblies 300. Each of the electric motor assemblies 300 includes a rotor assembly 310 and a stator assembly 320. Each of the stator assemblies 320 is configured for electrical communication with an electricity source 303 and is operable with one of the rotor assemblies 310 to rotate the associated rotor assembly 310 relative to the stator assembly 320 and drive the associated stage of compressor rotor blades 304 about the axial direction. Between each stage of compressor rotor blades 304 can be differential bearings 332 that allow each stage of compressor rotor blades 304 to be rotationally coupled to each other.

More specifically, the turbine engine comprises a first electric motor assembly 300*a*, a second electric motor assembly 300*b*, a third electric motor assembly 300*c*, and a fourth electric motor assembly 300*d*. The first electric motor assembly 300*a* includes a first stator assembly 320*a* and a first rotor assembly 310*a*. The first stator assembly 320*a* is operable with the first rotor assembly 310*a* to rotate the first rotor assembly 310*a* relative to the first stator assembly 320*a* and drive a first stage of compressor rotor blades 304*a* about the axial direction. The second electric motor assembly 300*b* includes a second stator assembly 320*b* and a second rotor assembly 310*b*. The second stator assembly 320*b* is operable with a second rotor assembly 310*b* to rotate the second rotor assembly 310*b* relative to the second stator assembly 320*b* and drive a second stage of compressor rotor blades 304*b* about the axial direction. As shown in the examples of FIGS. 3 and 5, the first rotor assembly 300*a* and the second rotor assembly 300*b* rotate independently and do not share a common shaft. The third electric motor assembly 300*c* and the fourth electric motor assembly 300*d* operate similarly.

Still referring to the example depicted in FIG. 5, because each of the stator assemblies 320 is operable with a different one of the rotor assemblies 310 to rotate its associated rotor assembly 310 relative to the associated stator assembly 320, each rotor assembly 310 of each electric motor assembly 300 is rotatable relative to another one of the rotor assemblies 310. For example, the first rotor assembly 310*a* of the first electric motor assembly 300*a* is rotatable relative to the second rotor assembly 310*b* of the second electric motor assembly 300*b*. The second rotor assembly 310*b* of the second electric motor assembly 300*b* is rotatable relative to the third rotor assembly 310*c* of the third electric motor assembly 300*c*. The third rotor assembly 310*c* of the third electric motor assembly 300*c* is rotatable relative to the fourth rotor assembly 310*d* of the fourth electric motor assembly 300*d*.

Because each of the rotor assemblies 310 is rotatable relative to another one of the rotor assemblies 310, the speed that each rotor assembly 310 rotates can be independently controlled. For example, the speed of rotation of the first rotor assembly 310*a* can be less than that of the second rotor assembly 310*b*; the speed of rotation of the second rotor assembly 310*b* can be less than that of the third rotor assembly 310*c*; the speed of rotation of the third rotor assembly 310*c* can be less than that of the fourth rotor assembly 310*d*.

In another example, the speed of rotation of the first rotor assembly 310*a* and the second rotor assembly 310*b* can be equal; the speed of rotation of the third rotor assembly 310*c* and the fourth rotor assembly 310*d* can be equal. However, in this example, the speed of rotation of the first rotor assembly 310*a* and the second rotor assembly 310*b* can be less than the speed of rotation of the third rotor assembly 310*c* and the fourth rotor assembly 310*d*.

Figure 6:
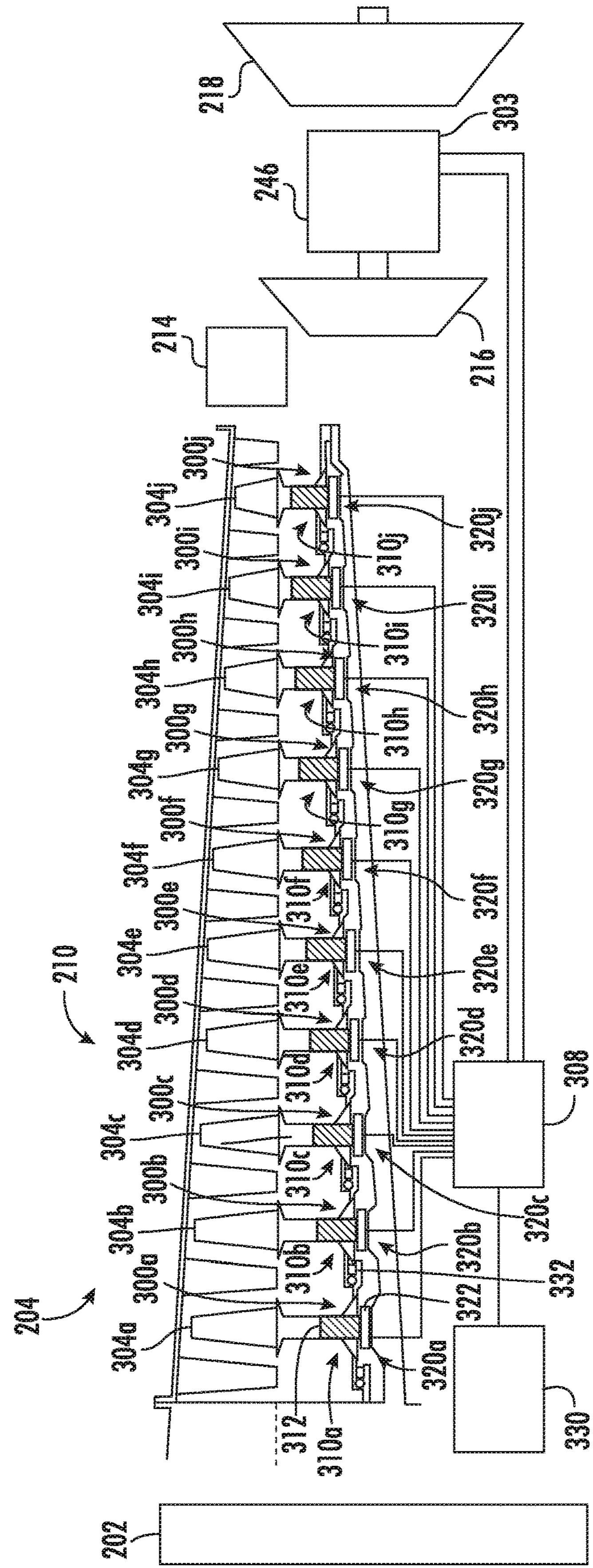
FIG. 6 is a schematic, cross-sectional view of an electric motor assembly embedded in a gas turbine engine in accordance with yet another exemplary embodiment of the present disclosure.

Referring now to FIG. 6, an electric motor assembly 300 embedded within a core turbine engine in accordance with an exemplary embodiment of the present disclosure is depicted. The exemplary gas turbine engine depicted in FIG. 6 may be configured in substantially the same manner as the exemplary gas turbine engine depicted in FIG. 5, and accordingly the same or similar numbers may refer to same or similar parts.

In this example the engine can include ten stages of compressor rotor blades 304 and, similarly to the previous example, the rotation of the rotor assembly 310 of each stage of compressor rotor blades 304 can be individually controlled. The number of stages of compressor rotor blades 304 rotating at a speed less than the other stages of compressor rotor blades 304 can be determined based on an engine parameter such as engine speed, temperature, or a compressor pressure ratio. More specifically and according to one example, the rotor assembly 310 of one of the electric motor assemblies 300 is rotatable at a rotational speed that is less than a rotational speed of another rotor assembly 310 when the gas turbine engine is operating at a speed greater than a threshold value. In contrast, when the gas turbine engine is operating at a speed less than a threshold value, the rotor assembly 310 is rotatable at a rotational speed that is substantially equal to the rotational speed of another rotor assembly 310.

Even more specifically and according to one example, when the engine is operating at a speed of greater than ninety-two percent, the FADEC 330 can send a signal to the controller 308 to rotate the first three stages of compressor rotor blades 304*a-c* at a speed less than the last seven stages of compressor rotor blades 304*d-j*; when the engine is operating at a speed of less than ninety-two percent, but greater than seventy percent, the FADEC 330 can send a signal to the controller 308 to rotate the first six stages of compressor rotor blades 304*a-f* at a speed less than the last four stages of compressor rotor blades 304*g-j*; when the engine is operating at a speed of less than seventy percent, the FADEC 330 can send a signal to the controller 308 to rotate all ten stages of compressor rotor blades a-j at an equal rotational speed.

Figure 7:
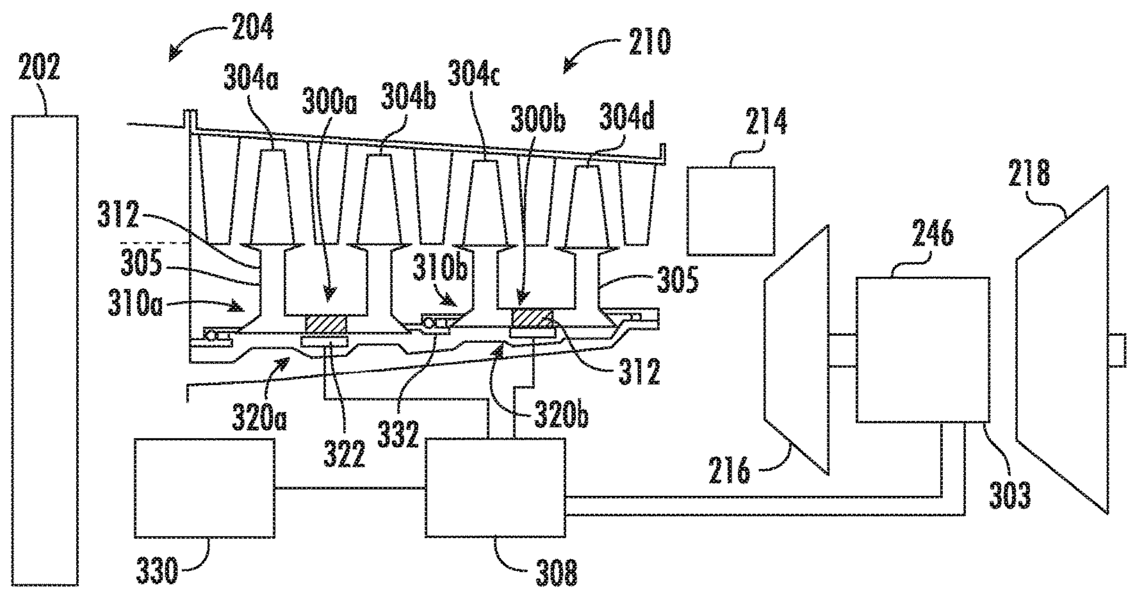
FIG. 7 is a schematic, cross-sectional view of an electric motor assembly embedded in a gas turbine engine in accordance with still another exemplary embodiment of the present disclosure.

Referring now to FIG. 7, an electric motor assembly 300 embedded within a core turbine engine in accordance with an exemplary embodiment of the present disclosure is depicted. The exemplary gas turbine engine depicted in FIG. 7 may be configured in substantially the same manner as the exemplary gas turbine engine depicted in FIG. 5, and accordingly the same or similar numbers may refer to same or similar parts.

In this example, stages of compressor rotor blades 304 are mechanically coupled, or ganged together, creating a ganged set 305 of stages of compressor rotor blades 304. More specifically, a first plurality of stages of compressor rotor blades are mechanically coupled, or ganged together, to create a first ganged set 305 of stages of compressor rotor blades 304, and a second plurality of stages of compressor rotor blades are mechanically coupled, or ganged together, to create a second ganged set 305 of stages of compressor rotor blades 304. A first electric motor assembly 300*a* is operable with the first ganged set 305 of stages of compressor rotor blades 304 and a second electric motor assembly 300*b* is operable with the second ganged set 305 of stages of compressor rotor blades 304.

More specifically, still, the first stage of compressor rotor blades 304*a* is mechanically coupled to the second stage of compressor rotor blades 304*b*; the third stage of compressor rotor blades 304*c* is mechanically coupled to the fourth stage of compressor rotor blades 304*d*. In one example, the first stage of compressor rotor blades 304*a* and the second stage of compressor rotor blades 304*b* is a unitary component; the third stage of compressor rotor blades 304*c* and the fourth stage of compressor rotor blades 304*d* is a unitary component.

The first stage of compressor rotor blades 304*a* and the second stage of compressor rotor blades 304*b* can include an electric motor assembly 300*a* located between the first stage of compressor rotor blades 304*a* and the second stage of compressor rotor blades 304*b*. The third stage of compressor rotor blades 304*c* and the fourth stage of compressor rotor blades 304*d* can include an electric motor assembly 300*b* located between the third stage of compressor rotor blades 304*c* and the fourth stage of compressor rotor blades 304*d*.

As such, the rotor assembly 310*a* of the first stage of compressor rotor blades 304*a* and the second stage of compressor rotor blades 304*b* is operable to rotate relative to the rotor assembly 310*b* of the third stage of compressor rotor blades 304*c* and the fourth stage of compressor rotor blades 304*d*.

One of the benefits of having a ganged set 305 of stages of compressor rotor blades 304, as opposed to individual stages of compressor rotor blades 304, is that it reduces the number of bearings included in the turbine engine. Reducing the number of bearing reduces the complexity of the turbine engine, which can decrease cost and weight.

Figure 8:
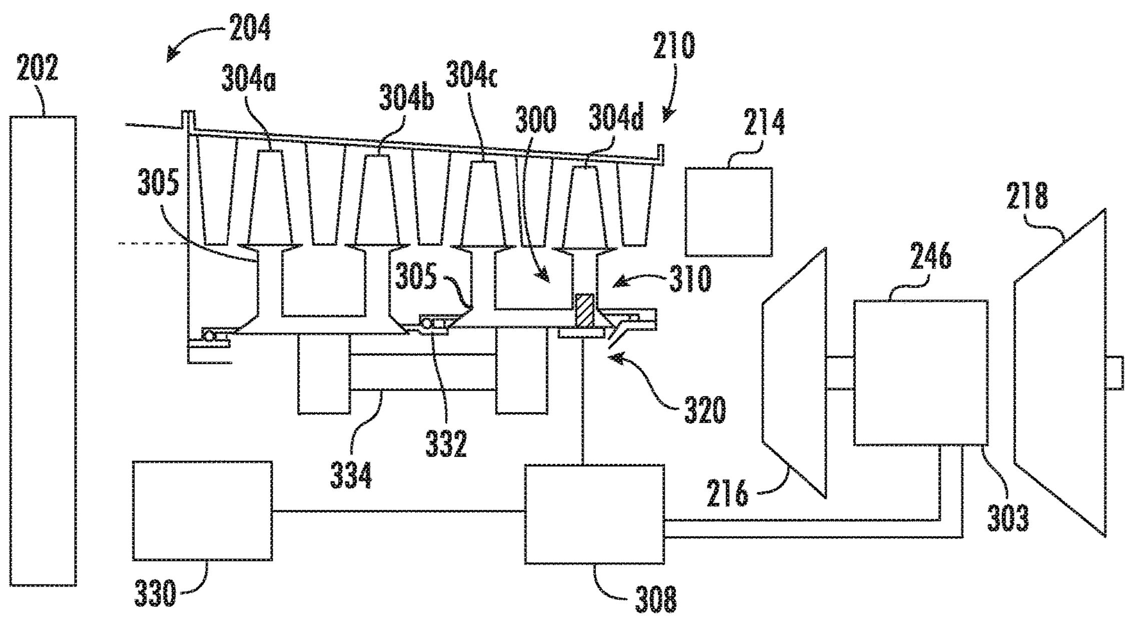
FIG. 8 is a schematic, cross-sectional view of an electric motor assembly embedded in a gas turbine engine in accordance with still another exemplary embodiment of the present disclosure.

Referring now to FIG. 8, an electric motor assembly 300 embedded within a core turbine engine in accordance with an exemplary embodiment of the present disclosure is depicted. The exemplary gas turbine engine depicted in FIG. 8 may be configured in substantially the same manner as the exemplary gas turbine engine depicted in FIG. 5, and accordingly the same or similar numbers may refer to same or similar parts.

In this example, an electric motor assembly 300 drives at least one stage of compressor rotor blades 304. The stage of compressor rotor blades 304 is in mechanical communication with a torque transfer device 334 that drives at least another stage of compressor rotor blades 304. The torque transfer device can include a reduction gearbox, a shaft, and a mechanism to connect to a stage of compressor rotor blades 304. The reduction gearbox can include an epicyclic gear set and can be configured to reduce a speed of rotation. As depicted in FIG. 8, an electric motor assembly 300 drives the third stage of compressor rotor blades 304*c* and the fourth stage of compressor rotor blades 304*d*, which can be mechanically coupled together such that it is a ganged set of stages 305 of compressor rotor blades 304. The third stage of compressor rotor blades 304*c* and the fourth stage of compressor rotor blades 304*d* are in mechanical communication with a torque transfer device 334 that is configured to output a speed of rotation to a shaft that is less than an input speed of rotation. The torque transfer device 334 is also connected to the first stage of compressor rotor blades 304*a* and the second stage of compressor rotor blades 304*b*, which can also be ganged together.

Because the first stage of compressor rotor blades 304*a* and the second stage of compressor rotor blades 304*b* are mechanically coupled to the third stage of compressor rotor blades 304*c* and the fourth stage of compressor rotor blades 304*d* through a torque transfer device 334 that is configured to output a speed of rotation that is less than an input speed of rotation, the speed of rotation of the first stage of compressor rotor blades 304*a* and the second stage of compressor rotor blades 304*b* is less than the third stage of compressor rotor blades 304*c* and the fourth stage of compressor rotor blades 304*d*.

Figure 9:
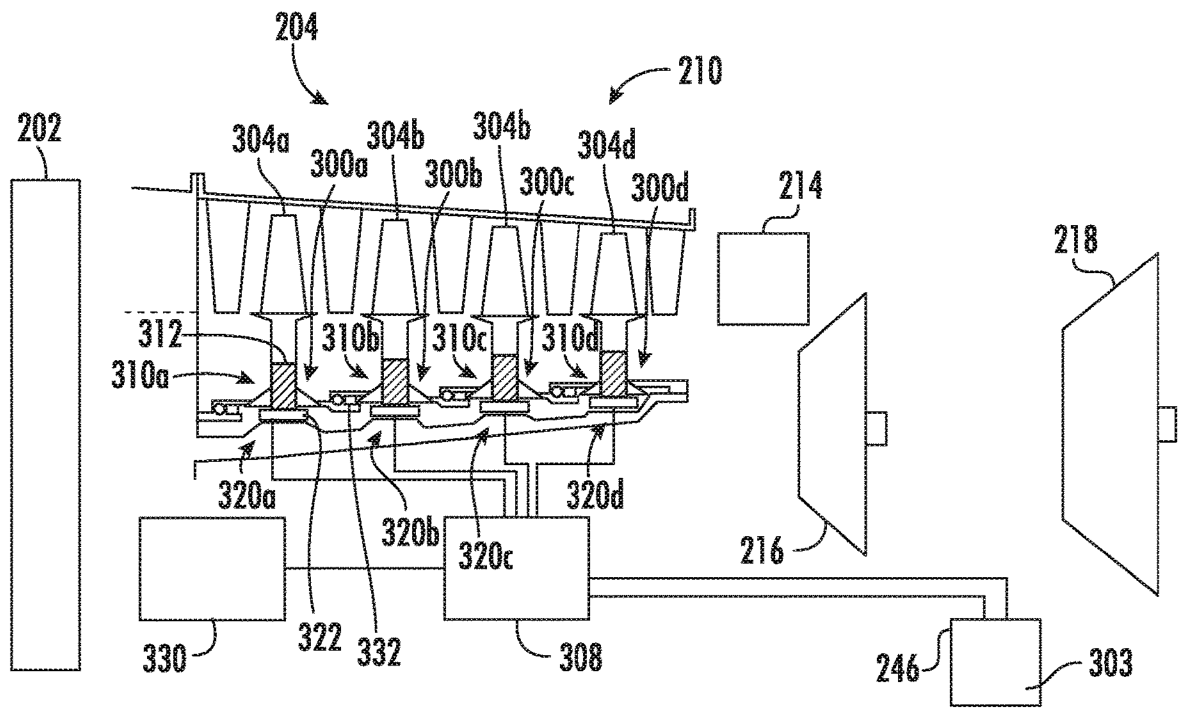
FIG. 9 is a schematic, cross-sectional view of an electric motor assembly embedded in a gas turbine engine in accordance with still another exemplary embodiment of the present disclosure.

Referring now to FIG. 9, an electric motor assembly 300 embedded within a core turbine engine in accordance with an exemplary embodiment of the present disclosure is depicted. The exemplary gas turbine engine depicted in FIG. 9 may be configured in substantially the same manner as the exemplary gas turbine engine depicted in FIG. 5, and accordingly the same or similar numbers may refer to same or similar parts. In this example, the gas turbine engine does not include an electric machine. Instead, the gas turbine engine has an electricity source 303 that is external to the gas turbine engine, such as an energy storage device 302, such as a battery. Alternatively, however, the electricity source 303 may be any other suitable external energy source, such as a dedicated electric generator, an electric generator of a different gas turbine engine, etc.

Figure 10:
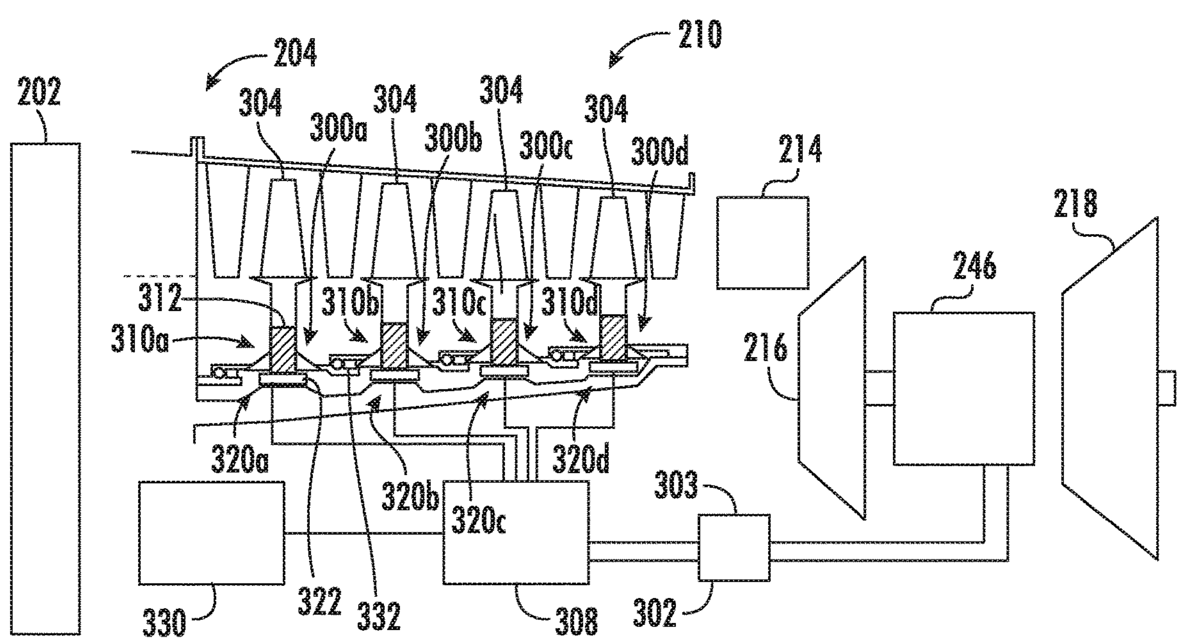
FIG. 10 is a schematic, cross-sectional view of an electric motor assembly embedded in a gas turbine engine in accordance with still another exemplary embodiment of the present disclosure.

Referring now to FIG. 10, an electric motor assembly 300 embedded within a core turbine engine in accordance with an exemplary embodiment of the present disclosure is depicted. The exemplary gas turbine engine depicted in FIG. 10 may be configured in substantially the same manner as the exemplary gas turbine engine depicted in FIG. 5, and accordingly the same or similar numbers may refer to same or similar parts. In this example, the gas turbine engine includes both an electric machine 246 and an energy storage device 302 as an electricity source 303. More specifically, the electric machine 246 produces electricity that is then stored in the energy storage device 302, and subsequently provided to the electric motor assembly(ies) 300.

It should be understood that several examples have been given; however, combinations of these examples are contemplated. For example, the gas turbine engine can include ten stages of compressor rotor blades 304 in each provided example, or any other suitable number of stages of compressor rotor blades 304 in any of the exemplary embodiments described herein with respect to FIGS. 3 through 10. More specifically, the gas turbine engine can include ten stages of compressor rotor blades 304 where two or more stages of compressor rotor blades 304 are coupled together and ganged such that each ganged set of stages of compressor rotor blades 304 are driven by a separate electric motor assembly 300, as generally shown in the FIG. 7 example. In another example, the gas turbine engine can include ten stages of compressor rotor blades 304 where at least one of the stages is in mechanical communication with another one of the stages of compressor rotor blades 304 through a torque transfer device such that one of the stages of compressor rotor blades 304 is driven by an electric motor assembly 300, that stage of compressor rotor blades 304 transfers torque to a torque transfer device that reduces a speed of rotation and then rotates another stage of compressor rotor blades 304, as generally shown in the FIG. 8 example.

As another example, any of the examples provided above can include both an electric machine and an energy storage device 302 or can include an electric machine or an energy storage device 302.

Figure 11:
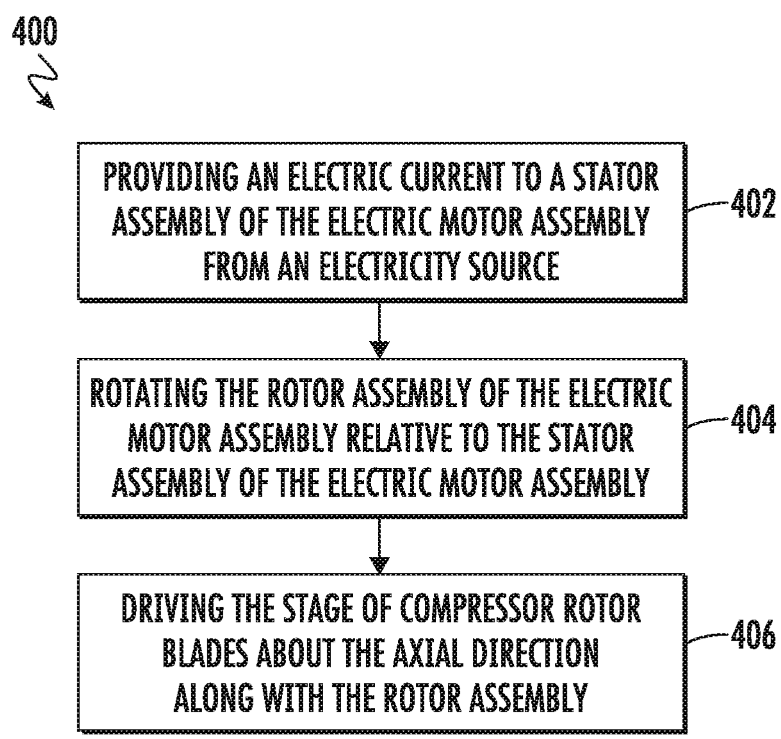
FIG. 11 is a flow diagram of a method for driving a stage of compressor rotor blades in accordance with an exemplary embodiment of the present disclosure.

FIG. 11 shows a flow diagram of a method 400 for driving a stage of compressor rotor blades in accordance with an exemplary embodiment of the present disclosure. In general, the method 400 will be discussed herein with reference to the core engine described above with reference to FIGS. 3-10. However, it should be appreciated by those of ordinary skill in the art that the disclosed method 400 may generally be implemented with gas turbine engines having any other suitable engine configuration and/or with systems having any other suitable system configuration. In addition, although FIG. 11 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, or adapted in various ways without deviating from the scope of the present disclosure.

As shown in FIG. 11, at step 402, the method 400 may include providing an electric current to a stator assembly of the electric motor assembly from an electricity source. The method 400, at step 404, may include rotating the rotor assembly of the electric motor assembly relative to the stator assembly of the electric motor assembly. The method 400, at step 406, may include driving the stage of compressor rotor blades about the axial direction along with the rotor assembly.

As mentioned, having a compressor that can operate efficiently throughout a speed range of an engine (e.g., a range of rotational speeds from startup to takeoff to cruise) without the expense and maintenance concerns of a variable vane system is beneficial. At least certain exemplary embodiments of the present disclosure achieves this by allowing the speed of rotation of at least certain stages of compressor rotor blades to be controlled individually. For example, in certain exemplary aspects, each of the stages of compressor rotor blades may be individually controlled. Reducing the speed of some of the stages, as compared to others can be beneficial and can increase efficiency. For example, reducing the speed of the first three stages of compressor rotor blades, as compared to the last seven stages of compressor rotor blades of a ten-stage compressor, when engine speed is at or below approximately ninety-two percent (for example, above ninety percent) can increase the efficiency of the compressor section. In this example, the first three stages of compressor rotor blades are rotating at the same speed, whereas the last seven stages of compressor rotor blades are rotating at the same speed.

Reducing the speed of the first six stages of compressor rotor blades, as compared to the last four seven stages of compressor rotor blades of a ten-stage compressor, when engine speed is below approximately ninety-two percent (for example, below ninety-four percent) can increase the efficiency of the compressor section. In this example, the first six stages of compressor rotor blades are rotating at the same speed, whereas the last four stages of compressor rotor blades are rotating at the same speed.

In addition, with the present disclosure, it is unnecessary to have a variable vane system within the compressor section. Eliminating the need for a variable vane system can decrease the expenses and maintenance concerns of having a variable vane system incorporated within a compressor section of a core engine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

1. A gas turbine engine defining a radial direction and an axial direction, the gas turbine engine comprising: a turbine section; and a compressor section arranged in serial flow order with the turbine section, the compressor section comprising a stage of compressor rotor blades; an electric motor assembly comprising: a rotor assembly coupled to, or integrated within, the stage of compressor rotor blades; and a stator assembly configured for electrical communication with an electricity source and operable with the rotor assembly to rotate the rotor assembly relative to the stator assembly and drive the stage of compressor rotor blades about the axial direction.

2. The gas turbine engine of any preceding clause, wherein the stage of compressor rotor blades is a ganged set of one or more stages of compressor rotor blades comprising a first stage of compressor rotor blades and a second stage of compressor rotor blades.

3. The gas turbine engine of any preceding clause, wherein the compressor section further comprises a third stage of compressor rotor blades, wherein the third stage of compressor rotor blades are rotatable relative to the ganged set of one or more stages or compressor rotor blades.

4. The gas turbine engine of any preceding clause, wherein the electric motor assembly is a first electric motor assembly, wherein the gas turbine engine further comprises a second electric motor assembly comprising: a second rotor assembly coupled to, or integrated within, a second stage of compressor rotor blades; and a second stator assembly configured for electrical communication with the electricity source and operable with the second rotor assembly to rotate the second rotor assembly relative to the second stator assembly and drive the second stage of compressor rotor blades about the axial direction; wherein the rotor assembly of the first electric motor assembly is rotatable relative to the second rotor assembly.

5. The gas turbine engine of any preceding clause, wherein the rotor assembly of the first electric motor assembly is in mechanical communication with the second rotor assembly through a torque transfer device having a plurality of gears.

6. The gas turbine engine of any preceding clause, wherein the rotor assembly of the first electric motor assembly is rotatable at a speed of rotation that is less than a speed of rotation of the second rotor assembly.

7. The gas turbine engine of any preceding clause, wherein the rotor assembly of the first electric motor assembly is rotatable at a rotational speed that is less than a rotational speed of the second rotor assembly when the gas turbine engine is operating at a speed greater than a threshold value, and wherein the rotor assembly of the first electric motor assembly is rotatable at a rotational speed that is substantially equal to the rotational speed of the second rotor assembly when the gas turbine engine is operating at a speed less than the threshold value.

8. The gas turbine engine of any preceding clause, wherein the electricity source is an electric machine coupled to a rotary component rotatable with the turbine section.

9. The gas turbine engine of any preceding clause, wherein the rotor assembly comprises a plurality of magnets and the stator assembly comprises a plurality of coils that is configured for electrical communication with the electricity source.

10. The gas turbine engine of any preceding clause, wherein there is a one-to-one ratio between the number of magnets and the number of coils, the plurality of magnets being operable with the plurality of coils to rotate the rotor assembly relative to the stator assembly.

11. A method for driving a stage of compressor rotor blades for a compressor section of a gas turbine engine about an axial direction, the gas turbine engine having a turbine section arranged in serial flow order with the compressor section and an electric motor assembly with a rotor assembly rotatable with the stage of compressor rotor blades, the method comprising: providing an electric current to a stator assembly of the electric motor assembly from an electricity source, wherein providing the electric current to the stator assembly of the electric motor assembly comprises: rotating the rotor assembly of the electric motor assembly relative to the stator assembly of the electric motor assembly; and driving the stage of compressor rotor blades about the axial direction along with the rotor assembly.

12. The method of any preceding clause, wherein the stage of compressor rotor blades is a ganged set of one or more stages of compressor rotor blades comprising a first stage of compressor rotor blades and a second stage of compressor rotor blades, and wherein driving the stage of compressor rotor blades about the axial direction with the electric motor assembly comprises driving the first stage of compressor rotor blades and the second stage of compressor rotor blades with the electric motor assembly.

13. The method of any preceding clause, wherein the compressor section further comprises a third stage of compressor rotor blades, wherein providing the electric current to the stator assembly comprises rotating the ganged set of one or more stages of compressor rotor blades relative to the third stage of compressor rotor blades.

14. The method of any preceding clause, wherein the electric motor assembly is a first electric motor assembly and the gas turbine engine has a second electric motor assembly that has a second rotor assembly rotatable with a second stage of compressor rotor blades, wherein the method further comprises: providing a second electric current to a second stator assembly of the second electric motor assembly from the electricity source, wherein providing the second electric current to the second stator assembly of the electric motor assembly comprises rotating the second rotor assembly of the second electric motor assembly relative to the second stator assembly of the second electric motor assembly; and driving the stage of second compressor rotor blades about the axial direction along with the second rotor assembly; wherein the rotor assembly of the first electric motor assembly is rotatable relative to the second rotor assembly.

15. The method of any preceding clause, further comprising rotating the rotor assembly at a first rotational speed, rotating the second rotor assembly at a second rotational speed that is less than the first rotational speed.

16. The method of any preceding clause, further comprising: rotating the rotor assembly at a first rotational speed, rotating the second rotor assembly at a second rotational speed that is less than the first rotational speed when the gas turbine engine is operating at a speed less than a threshold value, rotating the rotor assembly at a first rotational speed, rotating the second rotor assembly at a second rotational speed that is equal to the first rotational speed when the gas turbine engine is operating at a speed greater than the threshold value.

17. The method of any preceding clause, wherein the gas turbine engine has a second stage of compressor rotor blades, wherein the method further comprises: providing power to the second stage of compressor rotor blades from the electric motor assembly through a torque transfer device having a plurality of gears.

18. The method of any preceding clause, further comprising generating the electric current with an electric machine that is coupled to a rotary component that is rotatable with the turbine section.

19. The method of any preceding clause, wherein the rotor assembly comprises a plurality of magnets and the stator assembly comprises a plurality of coils that are each configured for electrical communication with the electricity source.

20. The method of any preceding clause, wherein there is a one-to-one ratio between the number of magnets and the number of coils, the plurality of magnets being operable with the plurality of coils to rotate the rotor assembly relative to the stator assembly.

What is claimed is:

1. A gas turbine engine defining a radial direction and an axial direction, the gas turbine engine comprising:

a turbine section; and a compressor section arranged in serial flow order with the turbine section, the compressor section comprising a first stage of compressor rotor blades and a second stage of compressor rotor blades;

a first electric motor assembly comprising:

a first rotor assembly coupled to, or integrated within, the first stage of compressor rotor blades; and a first stator assembly configured for electrical communication with an electricity source and operable with the first rotor assembly to rotate the first rotor assembly relative to the first stator assembly and drive the first stage of compressor rotor blades about the axial direction; and a second electric motor assembly comprising:

a second rotor assembly coupled to, or integrated within, the second stage of compressor rotor blades; and a second stator assembly configured for electrical communication with the electricity source and operable with the second rotor assembly to rotate the second rotor assembly relative to the second stator assembly and drive the second stage of compressor rotor blades about the axial direction;

wherein the first rotor assembly of the first electric motor assembly is rotatable relative to the second rotor assembly, wherein each of the first rotor assembly and the second rotor assembly are separately controllable by a controller, wherein the first rotor assembly of the first electric motor assembly is rotatable at a first rotational speed that is less than a second rotational speed of the second rotor assembly when the gas turbine engine is operating at a speed greater than a threshold value, and wherein the first rotor assembly of the first electric motor assembly is rotatable at a third rotational speed that is substantially equal to the second rotational speed of the second rotor assembly when the gas turbine engine is operating at a speed less than the threshold value, and wherein the first rotor assembly and the second rotor assembly rotate independently and do not share a common shaft.

2. The gas turbine engine of claim 1, wherein the first stage of compressor rotor blades and the second stage of compressor rotor blades form a ganged set of compressor rotor blades.

3. The gas turbine engine of claim 2, wherein a third stage of compressor rotor blades are rotatable relative to the ganged set of off compressor rotor blades.

4. The gas turbine engine of claim 1, wherein the first rotor assembly of the first electric motor assembly is in mechanical communication with the second rotor assembly of the second electric motor assembly through a torque transfer device having a plurality of gears.

5. The gas turbine engine of claim 1, wherein the electricity source is an electric machine coupled to a rotary component rotatable with the turbine section.

6. The gas turbine engine of claim 1, wherein at least one of the first or second rotor assembly comprises a plurality of magnets and at least one of the first or second stator assembly comprises a plurality of coils that are configured for electrical communication with the electricity source.

7. The gas turbine engine of claim 6, wherein there is a one-to-one ratio between the number of magnets and the number of coils, the plurality of magnets being operable with the plurality of coils to rotate the at least one of the first or second rotor assembly relative to the at least one of the first or second stator assembly.

8. A method for driving a first stage of compressor rotor blades and a second stage of compressor rotor blades for a compressor section of a gas turbine engine about an axial direction, the gas turbine engine having a turbine section arranged in serial flow order with the compressor section, a first electric motor assembly with a first rotor assembly rotatable with the first stage of compressor rotor blades, and a second electric motor assembly with a second rotor assembly rotatable with the second stage of compressor rotor blades, the method comprising:

providing an electric current to a first stator assembly of the first electric motor assembly from an electricity source, wherein providing the electric current to the first stator assembly of the first electric motor assembly comprises:

rotating the first rotor assembly of the first electric motor assembly relative to the first stator assembly of the first electric motor assembly; and driving the first stage of compressor rotor blades about the axial direction along with the first rotor assembly;

providing a second electric current to a second stator assembly of the second electric motor assembly from the electricity source, wherein providing the second electric current to the second stator assembly of the second electric motor assembly comprises rotating the second rotor assembly of the second electric motor assembly relative to the second stator assembly of the second electric motor assembly; and driving the second stage of compressor rotor blades about the axial direction along with the second rotor assembly;

wherein the first rotor assembly of the first electric motor assembly is rotatable relative to the second rotor assembly, wherein each of the first rotor assembly and the second rotor assembly are separately controllable by a controller, wherein the first rotor assembly of the first electric motor assembly is rotatable at a first rotational speed that is less than a second rotational speed of the second rotor assembly when the gas turbine engine is operating at a speed greater than a threshold value, and wherein the first rotor assembly of the first electric motor assembly is rotatable at a third rotational speed that is substantially equal to the second rotational speed of the second rotor assembly when the gas turbine engine is operating at a speed less than the threshold value, and wherein the first rotor assembly and the second rotor assembly rotate independently and do not share a common shaft.

9. The method of claim 8, wherein the first stage of compressor rotor blades and the second stage of compressor rotor blades form a ganged set of compressor rotor blades, and wherein the ganged set of compressor rotor blades are driven by the first and second electric motor assemblies.

10. The method of claim 9, wherein the compressor section further comprises a third stage of compressor rotor blades, wherein the method further comprising: rotating the ganged set of compressor rotor blades relative to the third stage of compressor rotor blades.

11. The method of claim 8, further comprising rotating the first rotor assembly at the first rotational speed, and rotating the second rotor assembly at the second rotational speed that is less than the first rotational speed.

12. The method of claim 8, wherein the method further comprising: providing power to the second stage of compressor rotor blades from the second electric motor assembly through a torque transfer device having a plurality of gears.

13. The method of claim 8, further comprising generating at least one of the first or second electric current with an electric machine that is coupled to a rotary component that is rotatable with the turbine section.

14. The method of claim 8, wherein at least one of the first or second rotor assembly comprises a plurality of magnets and at least one of the first or second stator assembly comprises a plurality of coils that are each configured for electrical communication with the electricity source.

15. The method of claim 14, wherein there is a one-to-one ratio between the number of magnets and the number of coils, the plurality of magnets being operable with the plurality of coils to rotate the at least one of the first or second rotor assembly relative to the at least one of the first or second stator assembly.

* * * * *